United States Patent
Zweighaft (12) 
(10) Patent No.: US 7,184,233 B2
(45) Date of Patent: Feb. 27, 2007

(54) DUAL SOURCE TRACKING SERVO SYSTEMS AND ASSOCIATED METHODS

(75) Inventor: James Zweighaft, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/861,220

(22) Filed: Jun. 4, 2004

(65) Prior Publication Data

US 2005/0270687 A1    Dec. 8, 2005

(51) Int. Cl.
*G11B 5/09* (2006.01)

(52) U.S. Cl. ................................................ 360/51

(58) Field of Classification Search ................ None
See application file for complete search history.

(56) References Cited

U.S. PATENT DOCUMENTS

| | | | |
|---|---|---|---|
| 2,937,239 A | 5/1960 | Walker et al. |
| 3,829,895 A | 8/1974 | Tanaka et al. |
| 3,919,697 A | 11/1975 | Walker |
| 3,971,002 A | 7/1976 | Bricot et al. |
| 4,056,830 A | 11/1977 | Smith |
| 4,110,799 A | 8/1978 | Bergmans et al. |
| 4,149,204 A | 4/1979 | Marino et al. |
| 4,176,381 A | 11/1979 | de Niet et al. |
| 4,321,634 A | 3/1982 | Lehureau |
| 4,334,252 A | 6/1982 | Toriu |
| 4,392,163 A | 7/1983 | Rijckaert et al. |
| 4,422,112 A | 12/1983 | Tanaka |
| 4,424,541 A | 1/1984 | Koinuma et al. |
| 4,439,793 A | 3/1984 | Nater |
| 4,449,082 A | 5/1984 | Webster |
| 4,472,750 A | 9/1984 | Klumpp et al. |
| 4,479,156 A | 10/1984 | Kumagai et al. |
| 4,502,082 A | 2/1985 | Ragle et al. |
| 4,539,615 A | 9/1985 | Arai et al. |
| 4,679,104 A | 7/1987 | Dahlerud |
| 4,685,005 A | 8/1987 | Fields, Jr. |
| 4,802,030 A | 1/1989 | Henry et al. |
| 4,816,939 A | 3/1989 | Ford et al. |
| 4,866,548 A | 9/1989 | Rudi |
| 4,975,791 A | 12/1990 | Eggebeen |

(Continued)

FOREIGN PATENT DOCUMENTS

EP    0 854 471 A1    7/1998

(Continued)

*Primary Examiner*—Wayne Young
*Assistant Examiner*—Glenda P. Rodriguez
(74) *Attorney, Agent, or Firm*—Morrison & Foerster LLP (57) ABSTRACT

In one example, a dual source tracking servo system includes a head assembly having a data transducer, a primary position detector for sensing the position of a magnetically stored data track, and a secondary position detector for sensing the position of a fixed reference associated with a magnetic storage medium. A controller is configured for adjusting the position of the head assembly in response to a weighted average of the sensed position of the magnetically stored data track and the fixed reference, wherein the position of the magnetically stored data track is weighted more than the position of the fixed reference. The primary position detector may include one or more dedicated servo read elements associated with the head assembly and the secondary position detector may include a magnetic or optical sensor. The fixed reference may include a tape edge or servo track.

32 Claims, 6 Drawing Sheets

U.S. PATENT DOCUMENTS

| | | |
|---|---|---|
| 4,979,051 A | 12/1990 | Eggebeen |
| 5,050,017 A | 9/1991 | Carr et al. |
| 5,055,959 A | 10/1991 | Saliba |
| 5,072,319 A * | 12/1991 | Kohri et al. ............. 360/77.16 |
| 5,121,270 A | 6/1992 | Alcudia et al. |
| 5,126,895 A | 6/1992 | Yasuda et al. |
| 5,132,861 A | 7/1992 | Behr et al. |
| 5,257,148 A | 10/1993 | Solhjell et al. |
| 5,262,908 A | 11/1993 | Iwamatsu et al. |
| 5,285,331 A | 2/1994 | White |
| 5,289,328 A | 2/1994 | Saliba |
| 5,294,803 A | 3/1994 | Pahr |
| 5,371,638 A | 12/1994 | Saliba |
| 5,426,551 A | 6/1995 | Saliba |
| 5,448,430 A | 9/1995 | Bailey et al. |
| 5,452,152 A | 9/1995 | Rudi |
| 5,488,519 A | 1/1996 | Ishida et al. |
| 5,523,904 A | 6/1996 | Saliba |
| 5,563,868 A | 10/1996 | Farnsworth et al. |
| 5,588,007 A | 12/1996 | Ma |
| 5,600,500 A | 2/1997 | Madsen et al. |
| 5,600,505 A * | 2/1997 | Ayres ...................... 360/77.12 |
| 5,617,269 A * | 4/1997 | Gordenker et al. ...... 360/77.12 |
| 5,757,575 A | 5/1998 | Hallamasek et al. |
| 5,796,537 A | 8/1998 | Goker et al. |
| 5,815,337 A | 9/1998 | Milo |
| 5,844,814 A | 12/1998 | Chliwnyj et al. |
| 5,847,892 A | 12/1998 | Goker |
| 5,862,014 A | 1/1999 | Nute |
| 5,940,238 A | 8/1999 | Nayak et al. |
| 5,949,604 A | 9/1999 | Saliba |
| 5,973,872 A | 10/1999 | Saliba |
| 5,973,874 A | 10/1999 | Panish et al. |
| 5,978,188 A | 11/1999 | Kaaden et al. |
| 5,982,711 A * | 11/1999 | Knowles et al. ......... 360/77.12 |
| 6,005,737 A | 12/1999 | Connolly et al. |
| 6,018,434 A | 1/2000 | Saliba |
| 6,061,199 A | 5/2000 | Goker et al. |
| 6,075,678 A | 6/2000 | Saliba |
| 6,084,740 A | 7/2000 | Leonhardt et al. |
| 6,088,184 A | 7/2000 | Hu |
| 6,108,159 A | 8/2000 | Nute et al. |
| 6,118,605 A | 9/2000 | Call et al. |
| 6,128,155 A | 10/2000 | Sugawara et al. |
| 6,130,792 A | 10/2000 | Goker |
| 6,134,072 A | 10/2000 | Zweighaft |
| 6,141,174 A | 10/2000 | Judge et al. |
| 6,166,874 A * | 12/2000 | Kim ............................ 360/75 |
| 6,188,532 B1 | 2/2001 | Albrecht et al. |
| 6,222,698 B1 | 4/2001 | Barndt et al. |
| 6,236,529 B1 | 5/2001 | Leonhardt et al. |
| 6,239,939 B1 * | 5/2001 | Bui et al. ................. 360/77.12 |
| 6,246,535 B1 | 6/2001 | Saliba et al. |
| 6,275,349 B1 | 8/2001 | Smith |
| 6,275,350 B1 | 8/2001 | Barndt |
| 6,285,519 B1 | 9/2001 | Goker |
| 6,307,718 B1 | 10/2001 | Kasetty |
| 6,331,920 B1 | 12/2001 | Albrecht et al. |
| 6,339,522 B1 | 1/2002 | Hoelsaeter |
| 6,366,422 B1 | 4/2002 | Daniel et al. |
| 6,433,951 B1 | 8/2002 | Lubratt |
| 6,493,174 B1 | 12/2002 | Stubbs |
| 6,512,651 B1 | 1/2003 | Eifert et al. |
| 6,545,837 B1 | 4/2003 | Tran |
| 6,570,731 B2 | 5/2003 | Zweighaft et al. |
| 6,650,495 B2 * | 11/2003 | Gill et al. ..................... 360/53 |
| 6,700,729 B1 | 3/2004 | Beck et al. |
| 6,768,608 B2 | 7/2004 | Saliba et al. |
| 6,775,083 B2 * | 8/2004 | Hilla et al. ................... 360/51 |
| 6,775,092 B2 | 8/2004 | Zweighaft et al. |
| 6,801,383 B2 | 10/2004 | Zweighaft et al. |
| 6,839,196 B2 | 1/2005 | Trivedi |
| 2002/0021524 A1 | 2/2002 | Saliba et al. |
| 2003/0043498 A1 | 3/2003 | Johnson et al. |
| 2004/0042115 A1 | 3/2004 | Saliba et al. |
| 2005/0083600 A1 | 4/2005 | Mahnad et al. |
| 2005/0083601 A1 | 4/2005 | Mahnad et al. |
| 2005/0083602 A1 | 4/2005 | Saliba et al. |
| 2005/0088770 A1 | 4/2005 | Saliba et al. |
| 2005/0088776 A1 | 4/2005 | Saliba et al. |
| 2005/0094308 A1 | 5/2005 | Mahnad et al. |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

DUAL SOURCE TRACKING SERVO SYSTEMS AND ASSOCIATED METHODS

BACKGROUND

1. Field of the Invention

The invention and its various aspects relate generally to magnetic tape storage devices and systems, and more particularly to methods and systems for head positioning servo systems.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, optical servo tracks, and the like. Other systems may intersperse or embed servo information with user data. Exemplary tape drive systems and methods are described, for example, in U.S. Pat. Nos. 6,246,535, 6,108,159, and 5,371,638, and U.S. patent application Ser. No. 09/865,215, all of which are hereby incorporated by reference herein in their entirety.

What is desired are methods and systems for more accurately positioning read and/or write heads with respect to data tracks of a magnetic storage tape in a tape drive during recording and/or reading processes, and doing so with increased accuracy and reduced cost and complexity.

BRIEF SUMMARY

One aspect of the present invention provides servo systems and accompanying methods for determining the relative position of a transducer head to a magnetic storage tape utilizing existing data structures on the magnetic storage tape and a fixed reference associated with the storage tape. The exemplary servo system and methods may be used with various exemplary storage media drive systems and methods.

In one example, a dual source tracking servo system is provided. The system includes a head assembly having a data transducer, a primary position detector for sensing the position of a previously written data track on a magnetic storage medium, and a secondary position detector for sensing the position of a fixed reference associated with the magnetic storage medium. The system further includes a controller for adjusting the position of the head assembly in response to a weighted average of the sensed position of the previously written data track and the position of the fixed reference, wherein the position of the previously written data track is weighted more than the position of the fixed reference. The primary position detector may include one or more dedicated servo read elements associated with the head assembly and the secondary position detector may include a magnetic or optical sensor. The fixed reference may include a tape edge or a magnetic or optical servo track.

In another example, a method for positioning a transducer head relative to a magnetic storage medium while writing a data track includes sensing the position of a previously written data track and sensing the position of a fixed reference associated with the storage medium relative to the transducer head. The transducer head may then be repositioned relative to the magnetic storage medium according to a weighted average of the sensed position of the previously written data track and the position of the fixed reference, wherein the position of the previously written data track is weighted more than the position of the fixed reference.

In another example, a method for sensing the position of a transducer head relative to a magnetic storage medium includes sensing a first feature of a magnetic storage medium to provide a primary source of position information to a magnetic drive servo system, and sensing a second feature of the magnetic storage medium to provide a secondary source of position information to a magnetic drive servo system. A relative offset of the transducer head with respect to the magnetic storage medium is determined from a combination of the primary source of position information and the secondary source of position information, where the primary source of position information is weighted more than the secondary source of position information.

Various aspects and examples of the present inventions are better understood upon consideration of the detailed description below in conjunction with the accompanying drawings and claims.

DETAILED DESCRIPTION

Various exemplary methods and systems for providing calibration and/or position information to a servo system are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the positioning of a transducer head relative to data tracks by utilizing two sources. A primary source of position information is obtained from existing data structures on the magnetic storage tape, e.g., from an adjacent, previously written data track (referred to herein as a "reference" data track). A secondary source of position information is obtained from a fixed reference associated with the magnetic storage tape, e.g., by sensing the position of the tape edge, a dedicated magnetic or optical servo track, or the like. A servo track may be conventionally preformatted or recorded to the storage tape prior to writing user data. Position information from the primary and secondary sources may be combined in various fashions by the positioning system to read and/or write data tracks with increased accuracy.

Deriving position information from the previously written data track to write each additional data track may result in long term drift or offset of the transducer head to a desired position on the magnetic storage tape. Generally, the average position indicated by detecting the previously written data track will have a non zero mean, such that as the number of data tracks recorded increases, errors tend to accumulate. Accumulated errors may result in excessive overwriting (resulting in potential data losses) or inefficient spacing of data tracks on the tape (resulting in potential data capacity loss). To reduce the accumulation of errors, position information from a secondary source that is fixed with respect to the magnetic tape may be combined with the position information from the previously written data track in a weighted fashion. The secondary position source thereby acts against accumulated errors and long term drift of the primary position source by adding or subtracting a small fraction of a track width from the position indicated by the primary position source.

In one example, position information from the primary source, e.g., from the previously written data track, is given greater weight than the secondary source to reduce excessive overwriting that may result in data loss and reduce long term drift from accumulated errors. In one example, the primary position source signal is weighted greater than the secondary position source signal at a ratio of 10:1. It should recognized, however, that in other examples and applications different weighting schemes are possible and contemplated. Generally, it is desired that the secondary source position information be weighted sufficiently to overcome the potential mean value drift of the primary source such that data tracks do not get too close to the edge of the magnetic tape resulting in data loss.

Additionally, because the secondary source is use to act against long term drifting, e.g., from accumulated errors, the secondary position source may be low-pass filtered. Generally, applying a low-pass filter to a servo signal is undesirable because of a loss in high frequency response of the servo system. High frequency response of the servo system, however, is available through the primary position source. Accordingly, a noisy secondary position source (relative to the primary position source) may be used that might otherwise be unacceptable for a tape drive servo system. For example, a simple optical sensor may be used to detect the tape edge and provide a suitable secondary source of positional information despite small, frequent irregularities in the position measurement along the tape edge, Additionally, depending on the particular system, desired track widths, and the like, hard limits may be employed on the secondary position source values.

In some examples, the methods and systems may be used without servo data or separate servo systems including, e.g., mechanical structures to mount optical systems or the like for detecting position information. With reduced mechanical structure, there may be an increase in servo actuator response, enabling higher actuator band width and finer track width resolution.

Exemplary tape drive systems and methods that may be used with the various exemplary dual source tracking servo systems and methods are described, for example, in U.S. Pat. Nos. 6,246,535, 6,108,159, and 5,371,638, and U.S. patent application Ser. No. 09/865,215, all of which are hereby incorporated by reference as if fully set forth herein. It will be recognized by those of ordinary skill in the art that various other suitable tape drive and servo systems may be used with one or more of the exemplary systems and methods of the present invention.

Figure 1:
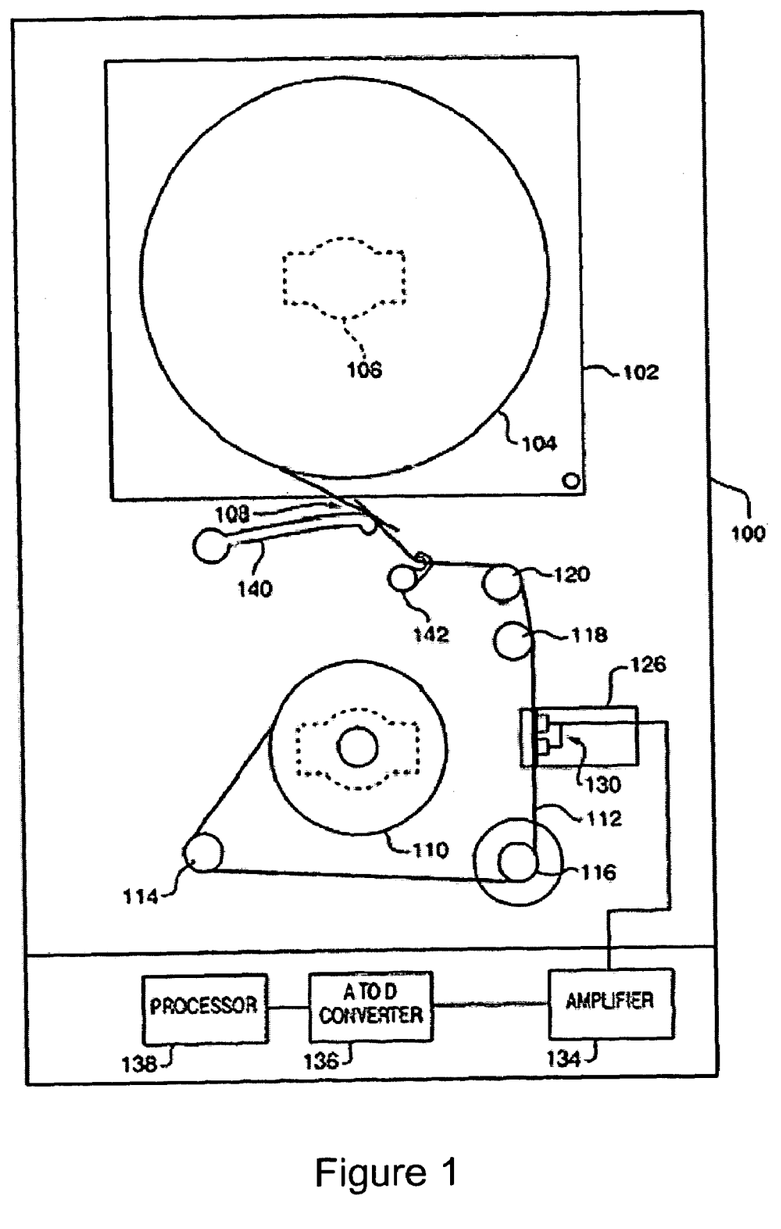
FIG. 1 illustrates an exemplary magnetic tape drive system including a dual source tracking servo system.

FIG. 1 illustrates, in block diagram form, an exemplary magnetic storage tape drive system having a dual source tracking servo system. The exemplary dual source tracking servo system is incorporated into a media transport, such as tape drive 100, that typically uses a roller guiding system. The magnetic tape media 112 is wound between supply reel 104 located in a magnetic tape cartridge 102 and take-up reel 110 located in the tape drive 100 through a magnetic tape path. The magnetic tape path comprises guide rollers 114, 116, 118, and 120 and tape head assembly 126. Tape drive 100 also includes other components commonly known in the tape drive art, such as catch 142 and positioning lever 140, used to connect magnetic tape media 112 with a leader 108 and wind the magnetic tape into magnetic tape drive 100. The tape head assembly 126 includes data transducers 130 to read and/or write data from magnetic tape media 112. The tape head assembly 126 positions is controlled by a head positioning apparatus (not shown) for moving the tape head 126 in a direction perpendicular to the motion of the magnetic tape media 112, across a width of the magnetic tape media 112.

Tape drive 100 may further include magnetic or optical sensors (see FIG. 2) to provide servo information to the tape drive 100. An optical sensor, if included, may be located on either side of magnetic tape 112 and be included with or adjacent head assembly 126 to sense a tape edge or optical marks forming a servo track. In other examples, a dedicated magnetic read head may be included with or adjacent head assembly 126 to read a fixed feature of the magnetic tape, e.g., a servo track or tape edge.

In one example, data transducers 130 are connected to an amplifier 134 that increases the amplitude of the signal output by the data transducers 130, and applies the amplified signal to the analog-to-digital converter 136. The analog-to-digital converter 136 outputs a digital representation of the detected signal to processor 138, which uses this signal in the edge determination process. Those skilled in the art will recognize that various other systems and methods for receiving and analyzing signals from the data transducers are possible and contemplated and may be carried out in software, hardware, firmware, or any combination thereof. Additionally, signals from magnetic and/or optical servo sensors may be similarly detected by processor 138 associated with drive 100. Additional elements, such as a low-pass filter and the like, which are known in the art, may also be included.

Figure 2:
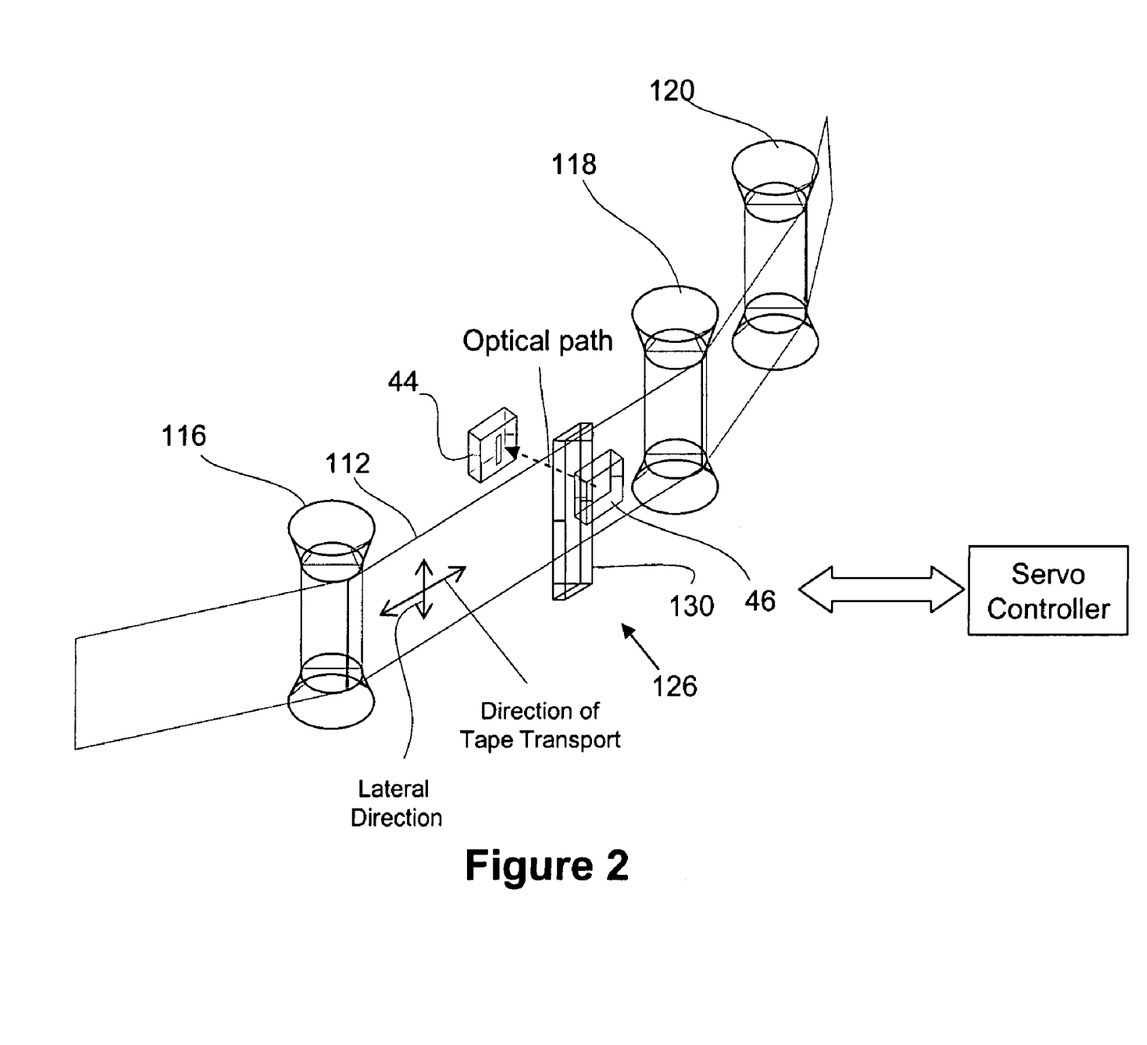
FIG. 2 illustrates an exemplary dual source servo system.

FIG. 2 illustrates components of an exemplary head assembly 126 including a dual source servo system according to one example. In this example, head assembly 126 includes a primary detector, and specifically, magnetic read elements configured to read and derive servo information from a previously written data track (as described in greater detail below). In other examples, servo read elements may be included in separate structures in a known or fixed relationship with data transducers.

Further, the exemplary head assembly includes a secondary detector having a light source 46 and an optical sensing device 44 configured to sense the edge of storage tape 112 and provide secondary source position information for the servo system. In other examples, light source 46 and sensor 44 may be configured to detect one or more optical servo patterns along tape 112. Light source 46 and sensor 44 may be positioned on the same side or opposite sides of tape 112, and may or may not be in a fixed spatial relationship with data transducers 126.

The following describes several exemplary methods for obtaining positional information from a previously written data track and a fixed reference associated with the magnetic tape that may be carried out with the above exemplary drive systems.

For a given read/write head geometry, the relative position of the read/write head with respect to the position of the track being accessed for writing or reading data (the active track) can be estimated (with some error) from the relative position of the head with respect the relative position of a previously written data track. The servo system may use the positional information to adjust the relative position of the magnetic read/write head and the tape. Accordingly, in one exemplary method, the primary source of positional information is determined from a previously written, adjacent data track. Positional information may be obtained from the previously written data track by various well known methods. For example, a head may include one or more fixed servo read heads configured in a spatial relationship to a write element to derive positional information from an adjacent data track while recording an active track.

Figure 3:
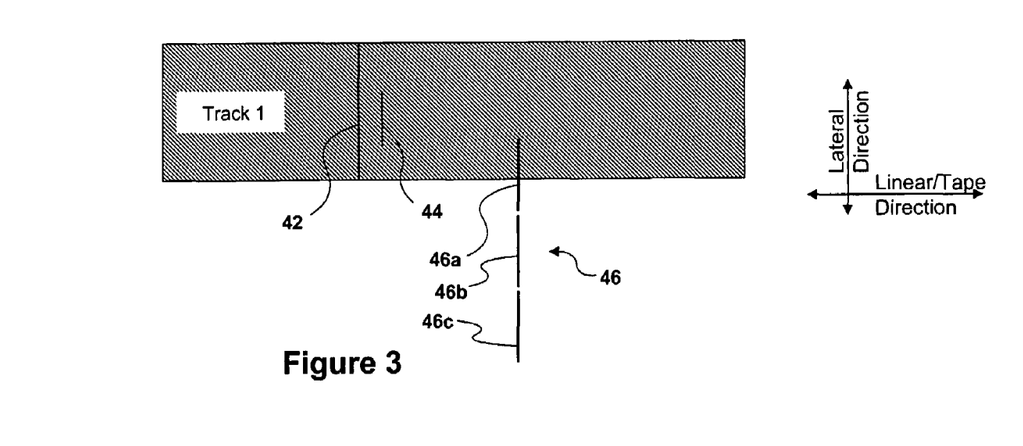
FIGS. 3–5 illustrate an exemplary magnetic head assembly relative to a magnetic storage medium during a writing process.
Figure 4:
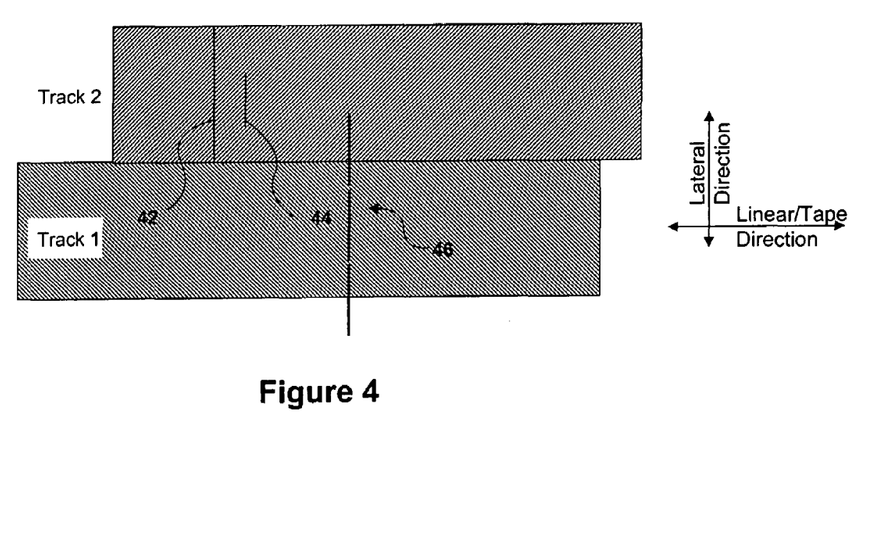
Figure 5:
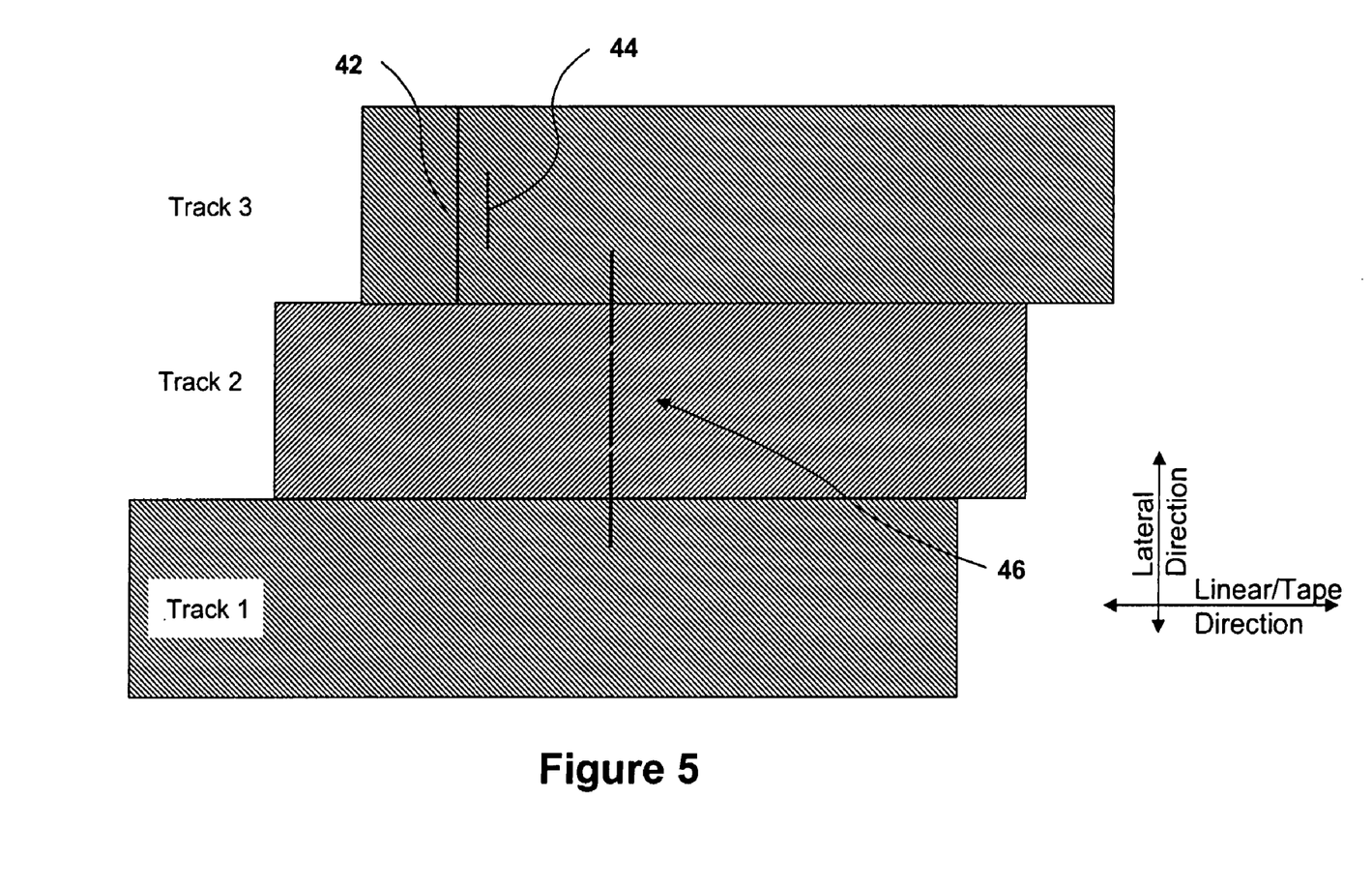

FIGS. 3–5 illustrate an exemplary head assembly configuration to derive positional information from previously written data tracks during a writing process. In this example, three magnetic servo read elements 46a, 46b, and 46c are used to derive positional information from an adjacent, previously written data track. The three servo read elements 46a, 46b, and 46c are aligned laterally and adjacent to each other. The width of each servo read element 46a, 46b, and 46c is approximately ½ the track width such that with the center read element 46b aligned over the middle of the previously written data track, servo read elements 46a and 46c will be half on and half off the previously written data track. In this example, the servo system can correlate the signals between center servo read element 46b and side servo read elements 46a and 46c. When the servo head 46 is properly aligned with the previously written track the center read element 46b will correlate similarly with servo read elements 46a and 46c, each being half over the previously written track. If the heads are laterally offset, correlation between servo read element 46b and servo read elements 46a and 46b will vary according to the direction and magnitude of the offset because read elements 46a and 46c will be disproportionately overlapping the previously written track.

FIG. 3 illustrates a first forward written data track using the forward elements of a head. Write element 42 and data read element 44 are disposed at nominal locations with track center and servo read elements 46, including top servo read element 46a, center servo read element 46b, and bottom servo read element 46c, are laterally and longitudinally displaced to data read element 44. The first data track 1 is written to the servo/LTM capability of the tape drive, e.g., open loop or with other drive servo systems, such as the secondary source systems, and servo read elements 46a, 46b, and 46c are not used. The lateral width of write element 42 and recorded track 1 in this instance are equal to the total of the minimum track width for read back and the maximum distribution of the LTM, e.g., six times the standard deviation. In some examples, data track 1 will be trimmed when the next track is written, and in such instances, the width of track 1 may be initially written larger than needed for successful read back.

FIG. 4 illustrates the second forward written data track, track 2, adjacent (and in some examples, overlapping and trimming the width) of track 1. The nominal orientation of writer element 42 and servo read elements 46 to the previously written track 1 is shown. In one example, the drive system will position write element 42 based on servo signals from servo read element 46 such that the first written data track 2 is written in a desired position relative to track 1 and reduce the potential for excessive overwriting resulting in data loss. Track 2 may be written adjacent to or slightly separated from track 1 in some examples, and in other examples, may be written to slightly overwrite or trim track 1. In this example, servo read elements 46 are positioned at track center of track 1 to provide position information for the head and write element 42. The spatial relationship between servo read elements 46 and write element 42 is such that by following track 1 with servo elements 46, track 2 is written at a preset location relative to track 1. In one example, servo read element 46 is configured to read and position write element 42 such that the worst case minimal trimming of track 1 will still result in a track width that may be read back by the system. For example, the minimum width may be set based on the ability of a 3-sigma drive LTM/head or the like.

FIG. 5 further illustrates the progression of writing data tracks. The third written forward data track, track 3, is written adjacent track 2 by sensing the position of track two with servo elements 46 similar to the writing of track 2 adjacent to track 1 by reading track 1. Additional tracks may be written with each iteration using the previously written data track to provide positioning information.

It will be recognized by those of skill in the art that various other servo read head designs, e.g., any number of servo read elements and configurations, are possible. For example, a servo read element may be configured to straddle two previously written data tracks and sense embedded servo signals in the previously written data tracks. As is well known in the art, alternating tracks may include embedded pilot tones at varying frequencies and the servo read element detects and compares the pilot tones to determine position information.

According to another exemplary method and system, a servo read element may be disposed at an edge of a previously written data track and data validity characteristics monitored. Alternatively, two or more servo heads may be placed at opposing edges of a previously written data track and signals monitored to determine relative position information.

It should be recognized that the exemplary methods of obtaining and positioning a data track adjacent a previously data track are illustrative only and various other methods and head configurations may be employed to gather positional information from a previously written data track. Further, various exemplary transducer heads may be used with the exemplary methods and systems. One exemplary head design includes a center tapped head having two or more read elements where one or more read elements are dedicated read elements positioned to derive servo positioning information from an adjacent data track.

The secondary position source, e.g., to reduce long term drift, accumulated errors, and the like, may include monitoring a fixed reference associated with the magnetic storage tape. In one example, the fixed reference includes a tape edge. In another example, the fixed reference includes a magnetic and/or optical servo track. The fixed reference, whether a tape edge, a servo track, or the like, may be detected by various suitable servo methods and servo systems including, but not limited to optical, magnetic, electric, or other combinations thereof. For example, a tape edge may be detected by various optical systems, or alternatively, by various magnetic head systems.

FIG. 2 illustrates one exemplary optical servo system for sensing the relative position of an edge of a storage tape 112. The optical servo system includes a light source 46 and an optical sensing device 44 configured to sense the edge of storage tape 1112. An optical path is shown in FIG. 2 extending between light source 46 and optical sensing device 44. Light source 46 illuminates, e.g., with incoherent light, the edge of tape 112. In one example, sensing device 44 includes an area or linear detector aligned along the lateral direction. Sensing device 44 detects light partially blocked by the edge of storage tape 112. A controller may adjust the position of head assembly 126 in response to signals from sensing device 44 associated with the detected light. For example, the controller may adjust the position of head assembly 126 to maintain the intensity of the detected light at a particular value, thereby keeping the window at the same or similar size. In another example, the optical image of the edge of tape 112 may be determined and provided to the controller to adjust the head assembly 126.

In one example, sensing device 44 includes a phototransistor or photodiode; however, various suitable sensors may be used, e.g., CCD or CMOS devices. Changes to the read/write head and tape path assembly in existing drive systems, such as the SDLT drive, are generally minor and inexpensive and will be easily recognized by those of ordinary skill in the art.

It should be recognized by those of ordinary skill in the art that the exemplary servo methods for sensing the position of a tape edge are illustrative only and various modifications (including additions and subtractions of devices or actions) to the above methods and systems are possible. Additionally, various methods and systems may be used in combination with other optical tape edge servo methods and systems.

Figure 6:
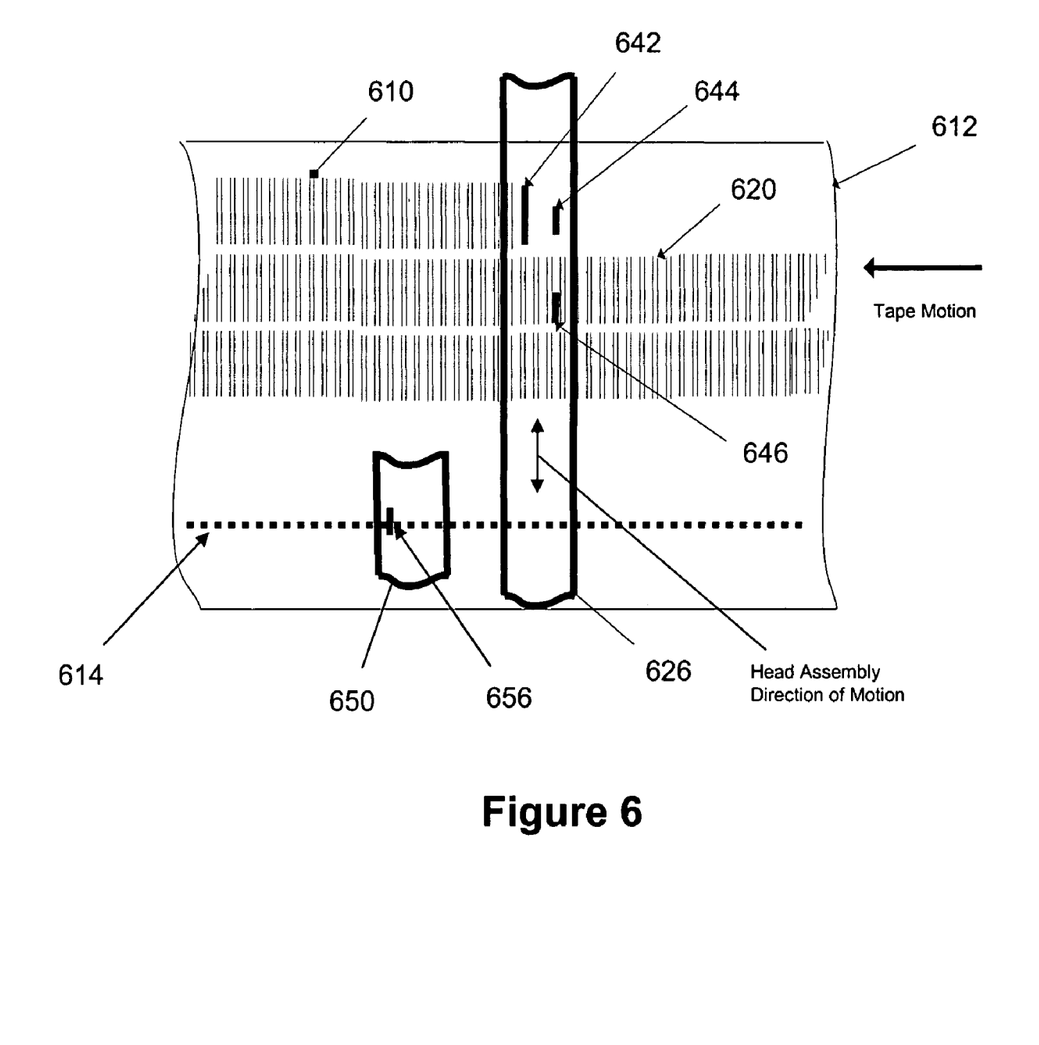
FIG. 6 illustrates an exemplary dual source servo system during a writing process.

FIG. 6 illustrates an exemplary dual source servo system during a writing process. In this example, head assembly 626 includes a servo read element 646 displaced laterally from data read element 644 and configured to be positioned over the far edge of previously written data track 620 during a writing process of track 610 by write element 642. Accordingly, the primary source of positional information is derived from the previously written data track 620 on tape 612.

Additionally, the dual source servo system includes a second sensor 656 included with structure 650 for detecting a fixed reference 614 associated with tape 612. In one example, head assembly 626 moves in a lateral direction with respect to the direction of tape motion and independently of structure 650, which is fixed with respect to the media drive or at least independent of movement of head assembly 626.

Fixed reference 614 may include a magnetic or optically detectable track along tape 612, e.g., a servo track, which may include a preformatted or otherwise recorded track prior to writing user data. Sensor 656 may therefore include a magnetic or optical sensor adapted to detect fixed reference 614. Positional information from servo read element 646 and sensor 656 may be combined, e.g., in a weighted fashion as described above, to accurately position head 626 and write element 642 with the desired position of track 610 on tape 612.

Figure 7:
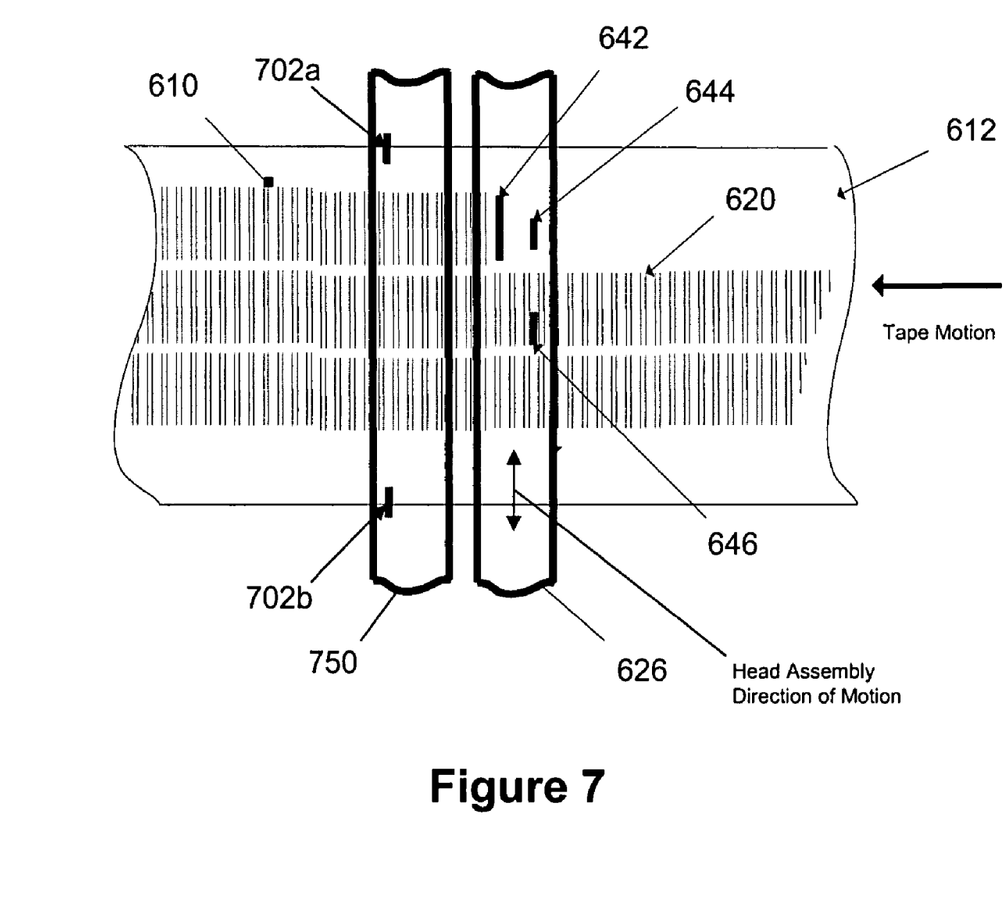
FIG. 7 illustrates an exemplary dual source servo system during a writing process.

FIG. 7 illustrates another exemplary dual source servo system during a writing process. FIG. 7 is similar to FIG. 6 except that the fixed reference includes the edge of tape 612. In this example, structure 750 includes two magnetic and/or optical elements 702a and 702b for sensing the position of the edge(s) of tape 612. In one example, structure 750 is stationary with respect to the media drive and head assembly 626 may move laterally with respect to tape 612 (as shown). Optical elements may operate to detect a tape edge as described above, for example, including a light source and detector adapted to detect the edge of the tape. Alternatively, magnetic elements may be used to detect the tape edge position; for example, U.S. Pat. No. 6,570,731, which is incorporated by reference herein in its entirety, describes an exemplary method for detecting an edge by measuring the ambient noise level of a magnetic-resistive read head when the magneto-resistive read head is the vicinity of the tape edge.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A magnetic storage drive head assembly and positioning servo system, comprising:
   a head assembly including a data transducer;
   a primary position detector for sensing a position of a previously written data track on a magnetic storage medium while writing a data track adjacent the previously written data track;
   a secondary position detector for sensing a position of a fixed reference associated with the magnetic storage medium while writing the data track; and
   a controller for adjusting the position of the head assembly while writing the data track in response to a weighted average of the sensed positions of the previously written data track and the fixed reference, wherein the position of the previously written data track is weighted to the position of the fixed reference at more than a 5:1 ratio.

2. The system of claim 1, wherein the primary position detector includes at least one servo read element.

3. The system of claim 2, wherein the at least one read element is in a spatially fixed relationship with respect to a write element such that alignment of the at least one servo read element with at least a portion of the previously written data track aligns the write element adjacent the previously written data track.

4. The system of claim 1, wherein the primary position detector includes three servo read elements, the three servo read elements including a first servo read element positioned at track center of the previously written data track, and second and third servo read elements positioned laterally adjacent and on opposing sides of the first servo read element.

5. The system of claim 4, wherein the controller correlates servo read signals separately between a first read signal from the first servo read element and second and third read signals from the second and third servo read elements to determine relative offset of the transducer head to the previously written data track.

6. The system of claim 1, wherein the secondary position detector includes an optical detector adapted to detect an edge of the storage medium.

7. The system of claim 1, wherein the secondary position detector includes an optical detector adapted to detect a servo track on the storage medium.

8. The system of claim 1, wherein the secondary position detector includes a magnetic detector adapted to detect an edge of the storage medium.

9. The system of claim 1, wherein the secondary position detector includes a magnetic detector adapted to detect a servo track on the storage medium.

10. The system of claim 1, wherein the controller weighs the position of the previously written data track to the position of the fixed reference at a 10:1 ratio.

11. The system of claim 1, further including a low pass filter, wherein a signal from the secondary position sensor is filtered by the low pass filter.

12. The system of claim 1, wherein the sensed positions of the previously written data track and the fixed reference are sensed continuously while writing the data track.

13. A method for positioning a transducer head relative to a magnetic storage medium, comprising:
    writing a data track to a storage medium with a transducer head;
    sensing a position of a previously written data track relative to the transducer head while writing the data track;
    sensing a position of a fixed reference associated with the storage medium relative to the transducer head while writing the data track; and
    repositioning the transducer head relative to the storage medium while writing the data track according to a weighted average of the sensed position of the previously written data track and the sensed position of the fixed reference, wherein the position of the previously written data track is weighted to the position of the fixed reference at more than a 5:1 ratio.

14. The method of claim 13, wherein the act of sensing the fixed reference includes optically detecting the fixed reference.

15. The method of claim 13, wherein the act of sensing the fixed reference includes magnetically detecting the fixed reference.

16. The method of claim 13, wherein the fixed reference includes an edge of the storage medium.

17. The method of claim 13, wherein the fixed reference includes a servo track.

18. The method of claim 13, wherein the fixed reference includes a magnetically detectable servo track.

19. The method of claim 13, wherein the fixed reference includes an optically detectable servo track.

20. The method of claim 13, wherein sensing the position of the previously written data track includes receiving a read signal from at least one servo read element associated with the transducer head, the read signal generated in response to the previously written data track.

21. The method of claim 13, wherein sensing the position of the previously written data track includes receiving read signals from three servo read elements including a first servo read element positioned at track center of the previously written data track, and the second and third servo read elements positioned laterally adjacent and on opposing sides of the first servo read element.

22. The method of claim 21, further including correlating the read signals separately between a first signal from the first servo read element and second and third signals from the second and third servo read elements to determine a relative offset of the transducer head to the previously written data track.

23. The method of claim 13, wherein the position of the previously written data track is determined from a characteristic of a read signal generated in response to the previously written data track.

24. The method of claim 23, wherein the characteristic of the read signal varies as a function of offset between the reference track and a read element.

25. The method of claim 23, wherein the position of the previously written data track is weighted to the position of the fixed reference at a 10:1 ratio.

26. The method of claim 23, wherein sensing the position of the fixed reference include filtering a position signal with a low pass filter.

27. The method of claim 13, wherein the sensed positions of the previously written data track and the fixed reference are sensed continuously while writing the data track.

28. A method for sensing the position of a transducer head relative to a magnetic storage medium, comprising:
    writing a data track to a magnetic storage medium sensing a first feature of the magnetic storage medium to provide a primary source of positional information to a magnetic drive servo system while writing the data track;
    sensing a second feature of the magnetic storage medium to provide a secondary source of positional information to the magnetic drive servo system while writing the data track; and
    determining a relative offset of a transducer head with respect to the magnetic storage medium from a combination of the primary source of positional information and the secondary source of positional information, wherein the primary source of positional information is weighted to the secondary source of positional information at more than a 5:1 ratio.

29. The method of claim 28, wherein the first feature of the magnetic storage medium includes a previously written data track.

30. The method of claim 28, wherein the second feature of the magnetic storage medium includes a fixed reference associated with the magnetic storage medium.

31. The method of claim 30, wherein the fixed reference includes one or more of an edge of the storage medium, a longitudinal optical track, or a longitudinal magnetic track.

32. The method of claim 28, wherein the sensed positions of the first feature and the second feature are sensed continuously while writing the data track.

* * * * *